US010394232B2

(12) United States Patent
Harary et al.

(10) Patent No.: US 10,394,232 B2
(45) Date of Patent: Aug. 27, 2019

(54) CONTROL SYSTEM FOR SPD DEVICE AND HOME AUTOMATION

(71) Applicant: Research Frontiers Incorporated, Woodbury, NY (US)

(72) Inventors: Joseph M. Harary, New York, NY (US); Seth Van Voorhees, Short Hills, NJ (US); Steven M. Slovak, N. Massapequa, NY (US)

(73) Assignee: RESEARCH FRONTIERS INCORPORATED, Woodbury, NY (US)

( * ) Notice: Subject to any disclaimer, the term of this patent is extended or adjusted under 35 U.S.C. 154(b) by 558 days.

(21) Appl. No.: 15/054,826

(22) Filed: Feb. 26, 2016

(65) Prior Publication Data
US 2016/0252901 A1 Sep. 1, 2016

Related U.S. Application Data

(60) Provisional application No. 62/126,084, filed on Feb. 27, 2015.

(51) Int. Cl.
G05D 1/00 (2006.01)
G02B 26/00 (2006.01)
(Continued)

(52) U.S. Cl.
CPC ............ G05D 1/0011 (2013.01); B60Q 1/04 (2013.01); E06B 9/24 (2013.01); G01S 19/42 (2013.01);
(Continued)

(58) Field of Classification Search
CPC .................................................. G05D 1/0011
(Continued)

(56) References Cited

U.S. PATENT DOCUMENTS 5,917,410 A * 6/1999 Cecic ..................... G08B 13/04
340/541
6,094,140 A 7/2000 Parente
(Continued)

FOREIGN PATENT DOCUMENTS

DE 102010006149 A1 8/2011
DE 102013002430 A1 8/2014
(Continued)

OTHER PUBLICATIONS

International Search Report dated Jun. 9, 2016 in corresponding International Application No. PCT/US16/20016.
(Continued)

Primary Examiner — Moazzam Hossain
Assistant Examiner — Omar F Mojaddedi
(74) Attorney, Agent, or Firm — Ostrolenk Faber LLP

(57) ABSTRACT

A control system controls one or more appliances or devices and includes a remote control unit, or other device, to provide instructions for controlling the devices and appliances based on user input and other information provided to the remote control unit or other device. The other information may be information provided by sensors in the remote control device itself, or elsewhere, or information obtained by the remote control device from outside the remote control device. Information may be provided from outside the remote control device via a communication system and/or a computer system.

37 Claims, 9 Drawing Sheets

(51) Int. Cl.
*B60Q 1/04* (2006.01)
*E06B 9/24* (2006.01)
*G01S 19/42* (2010.01)
*G05B 15/02* (2006.01)
*H04L 12/28* (2006.01)

(52) U.S. Cl.
CPC .......... *G05B 15/02* (2013.01); *H04L 12/2827* (2013.01); *B60Q 2900/30* (2013.01); *E06B 2009/2464* (2013.01)

(58) Field of Classification Search
USPC ........................................................ 700/275
See application file for complete search history.

(56) References Cited

U.S. PATENT DOCUMENTS

| | | | |
|---|---|---|---|
| 7,672,270 B2 | 3/2010 | Roggero et al. | |
| 8,280,592 B2 | 10/2012 | Wisniowski | |
| 9,165,198 B2 | 10/2015 | Siegel et al. | |
| 2001/0045819 A1* | 11/2001 | Harris ................... | G08C 17/00 323/371 |
| 2003/0149526 A1* | 8/2003 | Zhou ..................... | G01S 5/0027 701/408 |
| 2003/0227777 A1 | 12/2003 | Schofield | |
| 2007/0053053 A1* | 3/2007 | Moskowitz ............. | E06B 9/24 359/296 |
| 2008/0294315 A1* | 11/2008 | Breed .................... | B60N 2/002 701/49 |
| 2009/0027759 A1 | 1/2009 | Albahri | |
| 2009/0029670 A1* | 1/2009 | Cho ....................... | G01C 21/00 455/344 |
| 2011/0115644 A1 | 5/2011 | Grotendorst et al. | |
| 2012/0013454 A1 | 1/2012 | Krugh, IV | |
| 2012/0282913 A1 | 11/2012 | Kaindl et al. ................. | 455/420 |
| 2013/0036175 A1 | 2/2013 | Lau | |
| 2013/0214925 A1 | 8/2013 | Weiss | |
| 2014/0035774 A1 | 2/2014 | Khlifi | |
| 2014/0052220 A1 | 2/2014 | Pedersen ........................ | 607/88 |
| 2014/0104077 A1 | 4/2014 | Engel et al. | |
| 2014/0244044 A1 | 8/2014 | Davis et al. | |
| 2014/0309806 A1 | 10/2014 | Ricci | |
| 2014/0379233 A1 | 12/2014 | Chundrlik, Jr. et al. | |
| 2015/0369509 A1 | 12/2015 | Schwarz et al. | |

FOREIGN PATENT DOCUMENTS

| | | |
|---|---|---|
| JP | 2001-068275 A | 3/2001 |
| JP | 2005-128976 A | 5/2005 |
| JP | 2005-151507 A | 6/2005 |
| JP | 2006-147183 A | 6/2006 |
| JP | 2006-338476 A | 12/2006 |
| JP | 2007-158574 A | 6/2007 |
| JP | 2010-050664 A | 3/2010 |
| JP | 2010-148718 A | 7/2010 |
| JP | 2012-094325 A | 5/2012 |
| JP | 2012-187995 A | 10/2012 |
| JP | 2014-229199 A | 12/2014 |

OTHER PUBLICATIONS

Written Opinion of the International Searching Authority dated Jun. 9, 2016 in corresponding International Application No. PCT/US16/20016.
IEEE Std 802.11p™-2010 IEEE Standard for Information Technology-Telecommunications and Information Exchange Between Systems—Local and Metropolitan Area Networks—Specific Requirements, Part 11: Wireless LAN Medium Access Control (MAC) and Physical Layer (PHY) Specifications, Amendment 6: Wireless Access in Vehicular Environments, IEEE Computer Society (51 pages).
IEEE Std 1609.2™-2016, IEEE Standard for Wireless Access in Vehicular Environments—Security Services for Applications and Management Messages, IEEE Vehicular Technology Society (240 pages).
ETSI EN 302 665 v1.1.1 (Sep. 2010), European Standard (Telecommunications series), Intelligent Transport Systems (ITS); Communications Architecture (44 pages).
International Preliminary Report on Patentability containing Written Opinion of the International Searching Authority dated Aug. 29, 2017 in corresponding International Application No. PCT/US2016/020016.
Extended European Search Report dated Aug. 9, 2018 in corresponding EP Application No. 16756538.1.
Office Action dated Dec. 10, 2018 in corresponding Japanese Patent Application No. 2017-545248 with English translation.
Office Action dated Jan. 29, 2019 in counterpart Japanese Patent Application No. 10-2017-7026426 with English translation.

* cited by examiner

CONTROL SYSTEM FOR SPD DEVICE AND HOME AUTOMATION

CROSS-REFERENCE TO RELATED APPLICATIONS

The present application claims benefit of and priority to U.S. Provisional Patent Application Ser. No. 62/126,084 entitled CONTROL SYSTEM FOR SPD DEVICE AND HOME AUTOMATION filed Feb. 27, 2015, the entire content of which is hereby incorporated by reference herein.

BACKGROUND

Field of the Disclosure

The present disclosure relates to a control system for controlling one or more devices, optionally including a light valve such as a suspended particle device (SPD). In particular, the present disclosure relates to a system in which a remote control device controls one or more other devices, based on user input and other environmental information provided to the remote control device from other sources or devices, including but not limited to a computer network and sensors included in the remote control device.

Related Art

Light valves have been known for more than seventy years for the modulation of light. As used herein, a light valve is defined as a cell formed of two walls that are spaced apart by a small distance, at least one wall being transparent, the walls having electrodes thereon, usually in the form of transparent, electrically conductive coatings. The cell contains a light-modulating element (sometimes herein referred to as an "activatable material"), which may be either a liquid suspension of particles, or a plastic film in which droplets of a liquid suspension of particles are distributed.

The liquid suspension (sometimes herein referred to as "a liquid light valve suspension" or "a light valve suspension") comprises small particles suspended in a liquid suspending medium. In the absence of an applied electrical field, the particles in the liquid suspension may assume random positions due to Brownian movement, and hence a beam of light passing into the cell is reflected, transmitted or absorbed, depending upon the cell structure, the nature and concentration of the particles, and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices" or "SPDs."

For many applications, as would be well understood in the art, it is preferable for the activatable material, i.e., the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects, e.g., bulging, associated with a high column of liquid suspension, can be avoided through use of a film, and the risk of possible leakage can also be avoided. Another advantage of using a plastic film is that in a plastic film, the particles are generally present only within very small droplets, and hence do not noticeably agglomerate when the film is repeatedly activated with a voltage.

As used herein, the terms "SPD film" and "light valve film" mean at least one film or sheet comprising a suspension of particles used, or intended for use, by itself or with other components as part of a light valve. The light valve film or SPD film comprises either: (a) a suspension of particles dispersed throughout a continuous liquid phase enclosed within one or more rigid or flexible solid films or sheets, or (b) a discontinuous phase of a liquid comprising dispersed particles, the discontinuous phase being dispersed throughout a continuous phase of a rigid or flexible solid film or sheet. The light valve film or SPD film may also comprise one or more other layers such as, without limitation, a film, coating or sheet, or combination thereof, which may provide the light valve film or SPD film with, for example: (1) scratch resistance, (2) protection from ultraviolet radiation, (3) reflection of infrared energy, and/or (4) electrical conductivity for transmitting an applied electric or magnetic field to the activatable material, (5) dielectric overcoatings, (6) color tinting, (7) photovoltaic and/or (8) acoustic control.

As noted above, the transparency of an SPD is controlled based on application of an electric voltage to the SPD. A variety of control devices, including remote control devices, may be used to control the voltage applied to the SPD. More specifically, the voltage applied in the SPD is controlled using some sort of voltage control element that may operate based on user input. The user input may be direct, for example, a user may adjust a knob or other input element, such as a button or dial, on the voltage control element. The input may be transmitted remotely as well, for example, via wireless transmission from a remote control device. Typical remote control devices communicate commands via wireless signals, which may be infrared, radio signals, ultrasonic signals or any other suitable wireless signal.

A recent trend in remote control technology is to provide a single remote control to control multiple devices or appliances. The most common examples of such remote controls are those typically provided by cable companies or other subscription broadcast services such as satellite TV providers which typically are provided to control a set-top cable or satellite box as well as being adaptable for controlling a TV. Some of these remotes are able to operate additional devices such as a DVD or Blu-Ray player, for example. More sophisticated universal remote controls may be used to control multiple audio visual (AV) devices including TV's, cable boxes, DVD and Blu-Ray players, audio receivers and tuners.

In addition, some advanced remote controls have been introduced for use in home automation systems that may be used to control not only AV equipment, but other aspects of the home such as lighting, heating, and even door locks. All of these remote controls, however, typically require user input instructions that are then transmitted to control devices.

In addition, the current popularity of smart phones and the ability of these devices to run computer-implemented applications, or apps, for specific purposes has allowed smart phones to be used as remote control devices. In some cases, the smart phone transmits signals by radio frequency, for example, via WiFi, Bluetooth, or cellular signal. Some phones include IR transmitters that allow them to transmit signals via IR as well. However, in these devices, users typically must directly intercede to enter information for controlling devices and control is limited to the user's entered instructions.

It would be desirable to provide a control system that allows for remote control of several devices based on user input as well as other information.

SUMMARY

It is an object of the present disclosure to provide a control system for controlling a plurality of devices that includes a remote control device that provides instructions based on user input and additional information provided to the remote control device. The additional information may be provided in the form of information provided by sensors in the remote control device or information provided from outside the remote control device and received via a computer or cellular network, for example.

A control system in accordance with an embodiment of the present application includes a control device in communication with the one or more devices, and a remote control device configured to transmit instructions to the control device to control operation of the one or more devices based on user input and current environmental information obtained by the remote control device.

A control system for controlling one or more devices in an automobile in accordance with an embodiment of the present application includes a control device in communication with the one or more of the devices and an information device configured to provide information to the control device such that the control device provides instructions to the one or more devices based on the information.

Other features and advantages of the present invention will become apparent from the following description of the invention which refers to the accompanying drawings.

DETAILED DESCRIPTION OF EMBODIMENTS OF THE INVENTION

Figure 1:
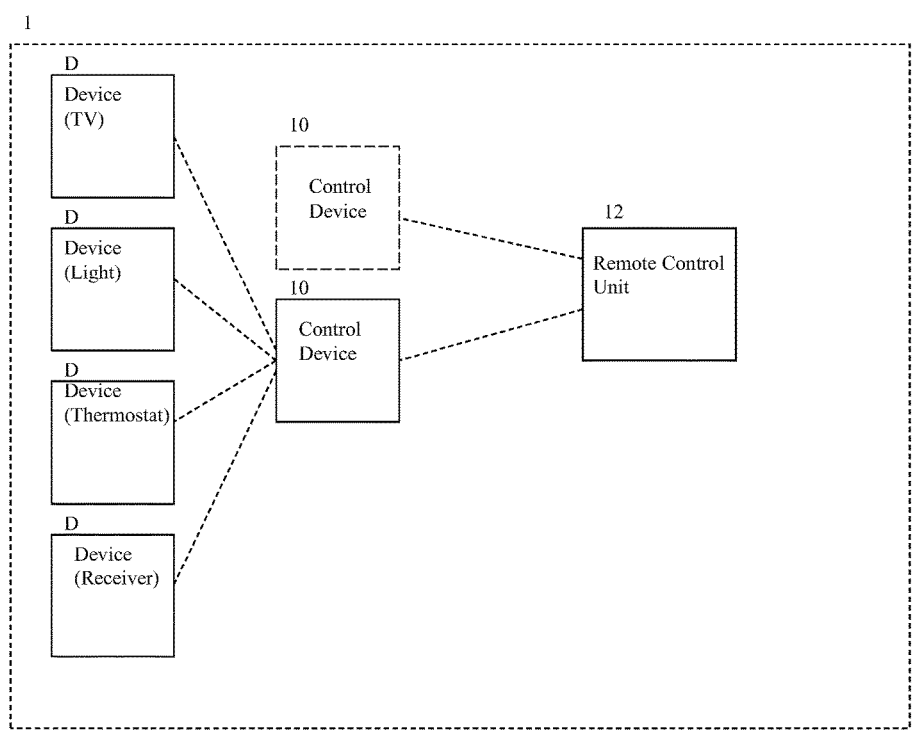
FIG. 1 is an exemplary block diagram of a control system in accordance with an embodiment of the present invention.

A control system 1 in accordance with an embodiment of the present disclosure is illustrated in FIG. 1 and preferably includes one or more control devices 10 that are connected to one or more devices D to be controlled by the system 1. A single control device 10 may be used to control all of the devices D, however, additional control devices (as illustrated in broken lines in FIG. 1) may be included, as desired. A separate control device 10 may be provided for each device D, if desired, or a single control device 10 may control multiple devices. The control device 10 may be incorporated into the specific device D or may be separate therefrom. In an embodiment, the control device 10 may be incorporated into the remote control unit 12. A remote control unit 12, separate from the control device 10, communicates with the control device 10 to provide instructions for controlling the devices D. The control devices 10 may communicate with the devices D, and thus, include commands or instructions that are recognizable by the respective devices D. These commands may be stored in a memory of the control device 10 or be retrievable by the control device 10.

The devices D may be any controllable device, including, but not limited to AV devices such as such as televisions, set-top boxes for cable or satellite systems, DVD players, Blu-Ray players, radio receivers or tuners, surround sound systems, speakers, other hand-held or portable devices, laptop or desktop computers, etc. as well as other devices such as lights, SPDs such as windows, shades, drapes, thermostats, door locks and even home appliances such as refrigerators, coffee machines, phones, heating systems, air conditioning systems, etc. While FIG. 1 identifies certain exemplary devices, the control system 1 is suitable for use in controlling virtually any electronic device or appliance.

Figure 2:
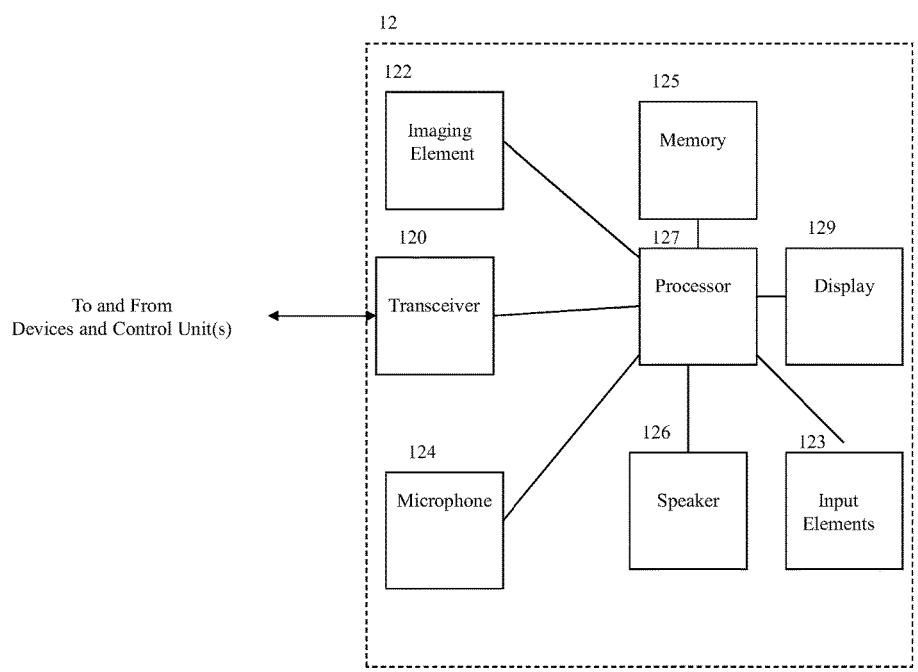
FIG. 2 is an exemplary block diagram of a remote control unit suitable for use in the control system of FIG. 1.

The remote control unit 12 may be embodied as a smart phone. As can be seen in the exemplary block diagram of FIG. 2, such devices typically include a processor 127 for processing computer readable instructions, a memory 125 for storing instructions and other data, a display 129 to display information to a user, and input elements 123 such as a keyboard or other buttons or dials. In some cases, the display 129 may be a touch screen, and thus, is also an input element. In addition, smart phones typically include camera functionality, such that they include an imaging element 122 suitable for capturing image data. Smart phones also typically include a microphone 124, or other audio pickup device and at least one speaker 126 to produce sound. In addition, smart phones include at least one transceiver 120 (transmitter/receiver) to transmit and receive wireless communication signals. Transceiver 120 is preferably suitable for use with cellular network telephone systems, WiFi systems, Bluetooth systems and GPS systems. If desired, separate transceivers may be used for each system. In addition, some smart phones also include infrared (IR) transmission systems or may include ultrasonic transmission systems. The transceiver 120 is preferably suitable for use with any other suitable wireless communication system as well.

Using WiFi and/or a cellular system, smart phones are typically able to connect to the Internet, and thus, receive information on a variety of issues. This information may be location information, since the location of the smart phone may be determined based on its location in the WiFi or cellular network, for example. Location information may also be obtained via GPS as well. In addition, more general information such as the temperature at a location can also be retrieved. In addition, while most smart phones include a clock, the time of day at a location can also be retrieved via the Internet, if desired, along with the date. In addition, information regarding the weather at a location may also be retrieved.

The imaging element 122 may be used to capture image information, but more generally may be used to determine general light levels in the area of the smart phone. Smart phones also often include motion-sensing equipment to provide information on the relative motion of the smart phone at a particular time. This motion sensing information may utilize location information, such as GPS information, and also may be used to help determine the exact location of the phone. Some smart phones may include a thermometer or other temperature-sensing element to provide information about the temperature in the vicinity of the smart phone. The processor 127 is linked to memory 125 as indicated and controls operation of the other elements of the smart phone remote control unit 12. Additional memory may be included as well. Control of the devices is preferably based on instructions provided to the processor from the memory 125, or otherwise provided to the processor 127. It will be understood that many other elements including chips that control radio communication, an antenna, a motherboard and software to control the hardware structures discussed above and herein, including an operating system, may also be included.

In the present specification, the terms remote control device and smart phone are used interchangeably. While a smart phone is preferred, other similar devices such as tablets and even laptop computers may be used as a remote control unit 12 in the system described herein.

In a preferred embodiment, the remote control 12 transmits instructions to the control device 10 based on information input from the user and additional information, referred to herein generally as environmental information, from the additional devices included therein, or otherwise, such as the imaging element 122, for example, and/or the Internet. The instructions sent to the control device 10 may relate to multiple devices D. FIG. 1 illustrates control device 10 transmitting instructions directly to each of the several devices D. As noted above, one or more control devices 10 may be used in the system 1, each of these devices may control all of the devices D, or may control a subset of the devices D. If desired, a separate control device 10 may be used for each of the devices D. This separate control device 10 may be incorporated into the respective device D that it controls, if desired. While the remote control unit typically provides instructions to the control device 10, the remote control device 12 may simply transmit information, such as the image information mentioned above, to the control device 10, which the control device may process to provide control signals to the devices D.

Figure 3:
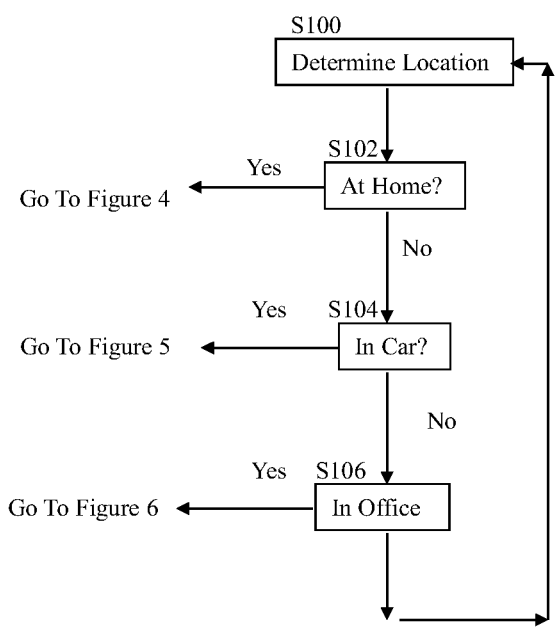
FIG. 3 is an exemplary flow chart illustrating operation of the remote control unit in determining its location.

FIG. 3 illustrates an exemplary flow chart illustrating operation of the system 1, including that of the remote control 12. In a preferred embodiment, the remote control unit 12 determines its location at step S100. This may be done in any desired manner, including using GPS, WiFi or the cellular network systems, or any other suitable method. After the location is determined, at step S102, a decision is made as to whether the remote control unit 12 is "at home," that is, in the user's home. If not, at step S104, a decision is made as whether the remote control unit 12 is in the car of the user. If not, at step S106, a decision is made as to whether the user is in his or her office. If not, the system 1 returns to step S100. If desired, a delay may be implemented before returning to step S100.

Figure 4A:
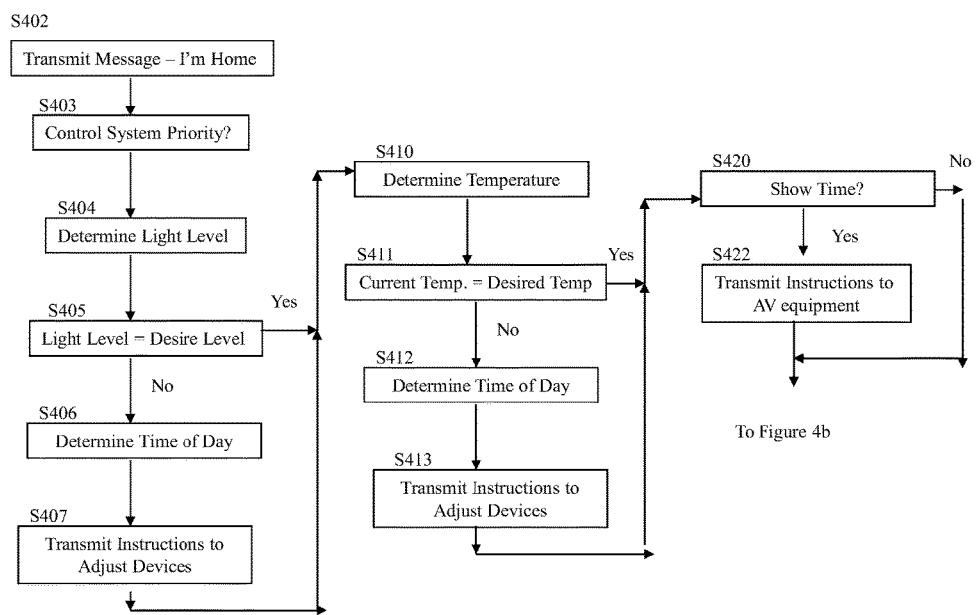
FIG. 4A is an exemplary flow chart illustrating the operation of the remote control device when it is located in a user's home.
Figure 4B:
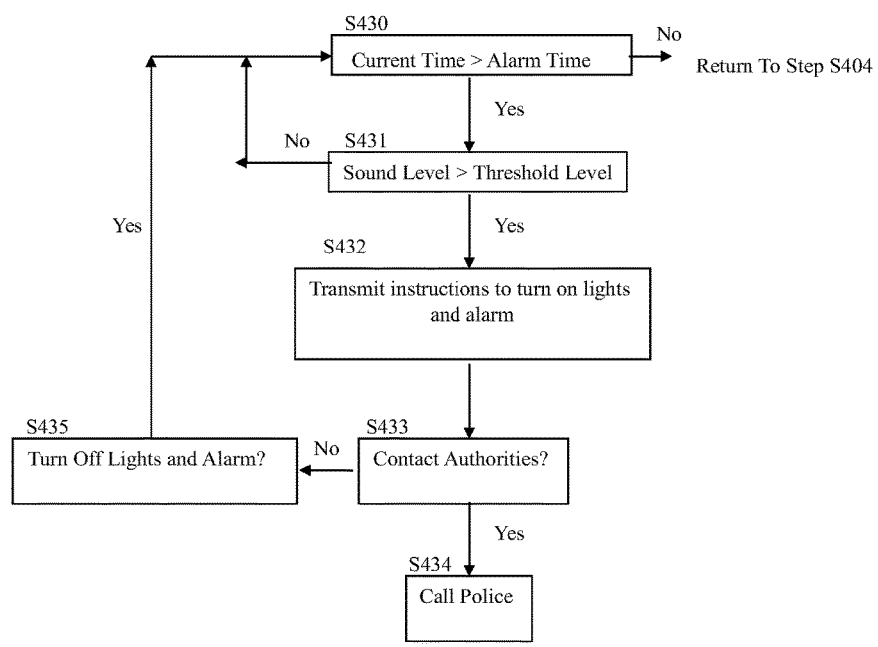
FIG. 4B is an exemplary flow chart illustrating additional operational steps of the remote control device when it is located in the user's home.

If a determination is made at step S102 that the user is at home, the system proceeds to the steps illustrated in FIG. 4A-4B. At step S402, the remote control unit 12 may transmit a message, via text, e-mail or any other suitable protocol to various family members to indicate the user is home. The user may identify the recipients of the message prior to use and this information may be stored in the remote control 12, in the memory 125, for example. At step S403, a determination is made as to whether or not the system 1 is given preference in the home. If the system 1 has preference (Y at step S403), this means that the user has indicated a preference for the system 1 such that it will always operate if the user is home. That is, the system 1 will control the various devices D in the home. This preference is input by the user and preferably stored in the memory 125. If the system 1 does not have priority (N at step S403) the method ends since the user has indicated that the system 1 should not provide control to the devices D.

At step S404, a determination is made as to the light level in the home by the remote control unit 12. This may be accomplished using the imaging element 122 of the remote control unit 12 (smart phone), for example, or may be received from another device, for example, a fixed position light sensor positioned locally. At step S405 the light level is compared to a desired light level. The desired light level is preferably set by the user and stored in the memory 125, for example. Alternatively, a default desired light level may be set and stored in memory. If the light level is below the desired light level, instructions are transmitted to increase light in the vicinity of the user in the home. These instructions may vary depending on other environmental information provided by or to the remote control unit 12. The various instructions are also stored in the remote control 12, in the memory 125, for example. This other information may include time of day, for example. The remote control unit 12 may include a clock, as noted above, or it may retrieve this information, if desired, from another device or from the Internet or any other suitable computer system or communication system. At step S406, a determination is made as to whether it is daytime or nighttime based on the time of day. Sunrise/sunset information may be retrieved by the smart phone and a calendar function is typically also available on smart phones. If it is daytime, the instructions to increase the light may include instructions to open a shade, and/or to increase transparency of an SPD window. If, on the other hand, the time of day indicates that it is not daylight, the instructions to increase light will be to turn on one or more lights in the home. The lights may be merely additional devices D that are controlled by the control device or devices 10. The instructions are transmitted in step S407. If the light level is equal to the desired light level at step S405, the system moves on to step S410, which is described below.

If, at step S405, the light level is above the desired level, instructions may be provided to decrease light. Again at step S406, a determination of time of day is made. If it is daytime, instructions are provided to close the blinds and/or reduce the transparency of an SPD window to reduce the light level in the room at step S407. If it is nighttime, instructions are provided to turn off one or more lights in the room that the user is in at step S407. Since it is nighttime, changing the transparency of the SPD will have little or no effect on the light level in the room.

Other actions may be implemented if the system 1 is determined to have priority at step S403. At step S410, a determination is made as to the current temperature in the vicinity of the remote control unit 12. The current temperature may be based on a thermometer or other temperature-sensing device in the remote control unit 12, or temperature information provided from another source. Some thermostats used in houses can independently transmit temperature information, wirelessly or via the Internet, which may be received by the remote control unit 12. In addition, or alternatively, local temperature information may be retrieved from the Internet. At step S411, a determination is made as to whether the current temperature is equal to a desired temperature. The desired information is preferably preset by the user and stored in the remote control, in the memory 125 or other memory element. A default desired temperature may also be set in the system 1. If the temperature is above the desired temperature, instructions will be transmitted to lower the temperature. If the temperature is below the desired temperature, instructions will be transmitted to raise the temperature. The specific instructions will depend on the time of day. As noted above, a determination is made at step S406 as to time of day. This information may be used in generating instructions for transmission. A separate step of determining time (step S412) is illustrated in FIG. 4, however, the information provided in step S406 may be used, if desired. If it is nighttime, at step S412, the remote control unit 12 sends instructions to a thermostat in the home to turn the heat down, or the air conditioning on, if appropriate. The determination of whether to provide instructions to turn the heat down, or turn the air conditioning on, in step S412 is based on time of year or season. This information is generally available via the Internet and/or is commonly set and tracked or retrieved on smart phones as part of the current time information used in step S406 or S412, or via a calendar on the smart phone. The location of the home and month may be used to indicate what season it is.

If the current temperature is below the desired temperature, instructions are provided to raise the temperature, which may depend on the time of day as well. If it is nighttime, at step S413, the remote control unit 12 sends instructions to a thermostat in the home to turn the heat up, or the air conditioning down, if appropriate. The determination of whether to provide instructions to turn the heat up or turn the air conditioning down in step S413 is based on time of year. In addition, if the time of day indicates that it is daytime, at step S406 or S412, the remote control sends 12 instructions to the blinds or SPD window to allow more light into the home to raise the temperature, or less light to lower the temperature. If the current temperature is the same as the desired temperature (Y at step S411) the system proceeds to step S420.

The user may wish to use the system to control various AV equipment as well. For example, at step S420, a determination is made as to whether the current time corresponds to a show time at which a TV show or movie is to be watched. The show time is preferably preset by the user and stored in the remote control unit 12. If the current time is equal to a scheduled show time, the remote control unit 12 transmits instructions to turn a TV on, and preferably to the desired channel at step S422. Channel information is preferably stored with the show time. These instructions preferably include any other instructions necessary to watch the TV show, including, for example, instructions to other audio/visual (AV) devices such as a set-top box for a cable or satellite system, a surround-sound or other sound system. These additional devices are simply additional devices D controllable by the system 1. The show time indicated in step S420 may reflect a show time for a radio program as well, or may simply be an indication that the user wishes to listen to music at a desired time. The instruction sent in step S422 may include instructions to change a radio receiver to a desired station or set a CD/MP3 player to play a particular track or tracks. Volume control instructions may also be included, if desired. This information may be set by the user or set by default based on the show involved, i.e. a TV show, DVD movie, CD or even a radio show.

In addition, the system 1 may be used to provide for home security as well. For example, at step S430 (See FIG. 4B, if the current time is past a certain time of night (an alarm time), for example, after midnight, the microphone 124 of the remote control unit 12 may be used to monitor suspicious sounds. At step S431, for example, a determination is made as to whether a sound detected by the microphone 124 exceeds a threshold sound level. This threshold sound level may be set by the user in advance and stored in the remote control unit 12. Alternatively, there may be a default threshold sound level that is saved in the remote control unit 12. This may be indicative of a broken window or forced door, for example. If so, the remote control unit 12 preferably transmits instructions at step S432 to turn on all of the lights in the house and to activate an audible alarm, such as that in a typical home security system, if available. The remote control unit 12 may also prompt a user to indicate whether to contact police or emergency personnel, at step S433. This prompt may be displayed visually, on a display 12 of the device, or may be audible. If the user says yes, or otherwise provides input to consent, or if no answer is received within a predetermined time (more than two minutes, for example) the remote control unit 12 will contact the police at step S434, either directly or via the control device 10, which may be connected to a phone. If the user indicates that the authorities are not to be called, the user is provided with the option of turning the lights and alarm off at step S435. In an embodiment, at step S431, the remote control unit 12 may simply listen for a security code word spoken by the user. If this word is detected, the lights and alarm may be activated in step S432. The security code word is preferably set by the user as well. The user will be given the option to contact the authorities in step S433 as well.

Figure 5:
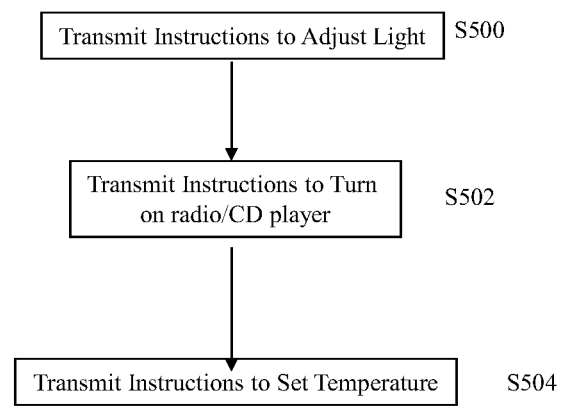
FIG. 5 is an exemplary flow chart illustrating operation of the remote control device when it is positioned in a user's car.

If at step S104, the remote control unit 12 is determined to be in the user's automobile or car (Y at step S104), the remote control unit 12 preferably transmits commands to adjust SPD windows in the car at step S500 (See FIG. 5). Steps of determining a light level and comparing it to a desired level, similar to steps S404-406 of FIG. 4A, may precede S500. In addition, the remote control unit 12 may transmit instructions to set a desire radio station, stored music or CD track, if desired at step S502. A step of determining if the current time is a show time similar to step S420 of FIG. 4A may precede this step. The instructions may be set by the user and stored in the memory 125, for example. Instructions may be sent to set a desired temperature in the car as well, at step S504, if desired. Steps of determining the temperature and comparing it to a desired temperature similar to steps S410-412 of FIG. 4A may precede this step. If desired, all of the instructions may be transmitted in a single step, step S500, for example. The SPD windows of the car, the radio, CD player and heating/AC controls of the car may be considered simply additional devices D. The car may include control device 10, or multiple control devices.

Figure 6:
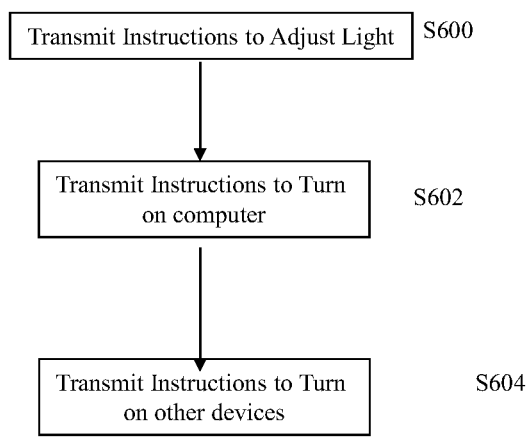
FIG. 6 is an exemplary flow chart illustrating operation of the remote control unit when it is positioned in a user's office or place of business.

If at step S106, the remote control unit 12 is determined to be at the office of the user (Y at step S106), the remote control unit preferably transmits commands to adjust SPD windows in the office to a desired translucence and/or to turn one or more lights on at step S600 (See FIG. 6). Steps of determining a light level and comparing it to a desired level may precede this step, similar to the steps S404-406 of FIG. 4A may precede this step. At step S602, instructions may be provided to turn on the user's computer, if desired. At step S604, instructions may be provided to turn on other devices in the office, such as a coffee machine, copier machine, etc. A step similar to the step of checking if the current time is a show time like step S420 in FIG. 4A may proceed this step. These instructions may be transmitted at the same time, if desired, at step S600. The other devices may also include a TV or radio receiver, etc. which may be controlled in a manner similar to that describe above with respect to FIG. 4, for example. While not explicitly shown, prior to step S600, a determination may be made to determine whether the remote control unit 12 has priority in the office, in a manner similar to that described above with respect to the home in step S403. If the remote control unit 12 does not have priority, the system reverts to S100. Otherwise, it proceeds to step S600 as noted above.

Figure 7:
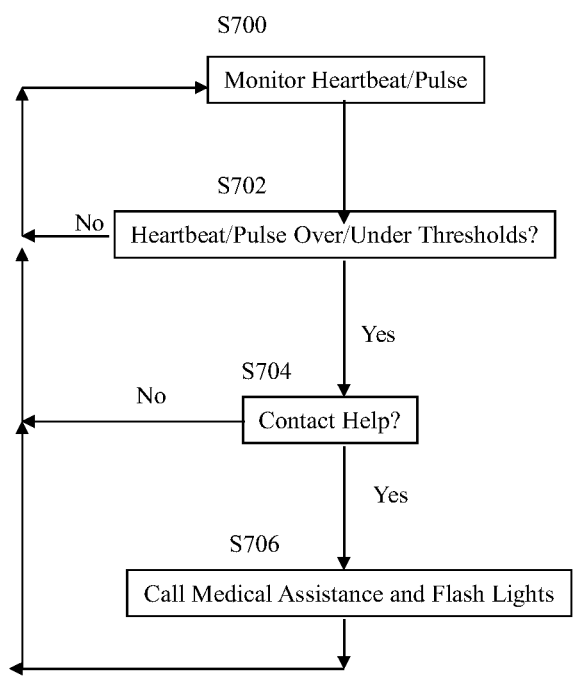
FIG. 7 is an exemplary flow chart illustrating operation of the remote control device to monitor user health.

The system may provide certain control functions regardless of location. In an embodiment, at step S700 (See FIG. 7), for example, a heartbeat or pulse of the user may be monitored by the remote control unit 12. It is common for smart phones, for example, to include biometric monitoring features. At step S702, a determination is made if the user heartbeat or pulse drops below a lower threshold level or rises above an upper threshold level. If so, the user is asked whether medical attention is necessary at step S704. If so, or if a predetermined period of time passes without a response (more than two minutes, for example) the remote control unit 12 contacts medical assistance by telephone, either directly or via a control unit 10, in the home, car or office at step S706. In addition, instructions are provided to turn on all lights in the home, along with the alarm, if the user is in the home. If the user is in the car, the lights may be flashed and the horn honked to attract attention. In the office, the lights may be flashed on an off to attract attention. If the user indicates that medical attention is not necessary, monitoring continues at step S700 and repeated inquiries are made if the user's heartbeat remains above or below the thresholds. Additionally, a smartphone text message to one or more persons can be automatically sent to alert them to the medical situation.

As described above, the control system 1 may be used to control a variety of devices or appliances in a variety of environments. An advantage of using a smart phone as a remote control device is that it allows the system to control various devices based on user input and other information gathered either by integral sensors in the remote control device and/or information obtained from outside the remote control 12, via other sources such as the Internet, for example. This provides more flexibility in controlling the various devices and reduces the amount of user intervention required.

Figure 8:
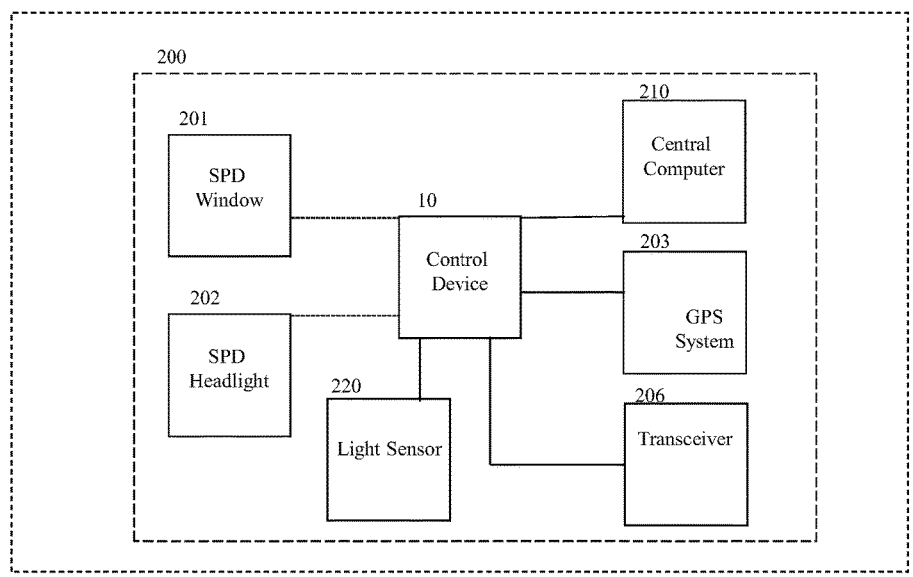
FIG. 8 is an exemplary block diagram of a control system in accordance with an embodiment of the present invention.

As noted above, the system 1 may be implemented in a car or other motor vehicle. In this case, the control device 10 may be a separate device or may be integrated into the automobile or a system or device thereof. FIG. 8 illustrates an exemplary block diagram of the system 1 implemented in an automobile 200. The automobile 200 may include an SPD window or windows 201 that are controllable to vary the tint of the windows. The control device 10 may be incorporated into these windows or simply connectable thereto, either via a wired or wireless connection, to control the tint of the SPD window. While a single control device 10 is illustrated in FIG. 8, additional control devices 10 may be provided as noted above with respect to FIG. 1. In an embodiment, the headlights 202 may utilize an SPD lens or other SPD element to control the brightness of the output thereof and thus will be referred to herein as SPD headlights. The control device 10 may be incorporated into the headlights 202 or may communicate with them in a wired or wireless connection to vary the brightness thereof. As noted above, the control device 10 may also be connected or integrated with other devices within the automobile, such as the horn, the radio or the heating/AC system, if desired. Thus, the SPD windows 201 and SPD headlights 202 may be thought of as additional devices D as discussed above with respect to FIG. 1, for example.

As noted above, in an embodiment, a remote control unit 12 may be used to provide instructions to the control device 10, for example, to control the devices D. While not explicitly shown in FIG. 8, the remote control unit 12 may also be used to provide instructions or other information to the control device 10 in the embodiment of FIG. 8. In addition, as noted above, the remote control unit 12 may be a smart phone or other mobile device, if desired.

The control device 10 in FIG. 8, however, may receive instructions or other information from other sources or devices as well. In one embodiment, the tint of the window 201 may vary based on the location of the automobile 200. Different jurisdictions may have different laws with respect to the extent that a window may be tinted. As noted above, the system 1 may use location information to control the devices D. Similarly, in the embodiment of FIG. 8, the automobile 200 may include a GPS system 203. The GPS system 203, and/or the control device 10 may also include information regarding limits on tinting in various jurisdictions. Alternatively, this information may be downloaded, via the remote control unit 12 (smart phone) or otherwise. For example, in the last several years there has been a rapid increase in mobile connectivity available in automobiles such that many new automobiles provide for connection to the Internet or other communication networks. The automobile itself may serve as a Wi-Fi connection point for other mobile devices such as smart phones and tablets. Access to the Internet through such a Wi-Fi connection would allow the automobile 200 to access information regarding tinting limits in whatever jurisdiction the automobile happens to be in. The control device 10 may access this information based on the location information provided by the GPS system. The control device 10 may then control the tinting of the windows 201 to comply with local law. This adjustment is preferably made automatically.

Alternatively, the user/driver may be notified of the conflict with local ordinance and given the option to approve the change in tint. This may be done via the remote control unit 12, or via a computer system 210 of the automobile 10, which is preferably connected to the control device 10. Most modern automobiles include a central computer system that monitors and controls operation of various systems of the automobile and allows input by the user either via buttons and switches or through a touch screen display. The control device 10 may simply be one more system that it monitored and controlled by the computer system 210. Alternatively, the control device 10 may be integrated into the computer system 210, if desired. The computer system 210 may be used to access and provide the information regarding window tinting mentioned above from the Internet or any other communications system. The computer system 210 may simply pass this information to the control device 10, or may use this information in addition to the location information from the GPS system 103 to determine whether a change in tint in window 201 is necessary to comply with local law and send instructions to the control device 10. This may be done by comparing a current tint level to the required or maximum tint level set by law in the location as indicated by the location information. Even if the user is not provided with the opportunity to accept or reject the change in tinting, the computer system 210 may be used to determine whether a tint change is necessary and communicate instruction to the control device 10.

In an embodiment, location information may be provided to automobile 200 from another automobile, if desired. Not only have automobiles been improved with respect to their ability to connect to the Internet, they have also been improved with respect to their ability to communicate with each other. For example, U.S. Pat. Nos. 8,280,592; 9,165,198 and 7,672,270 relate to communications systems and methods that allow for communication between moving automobiles. Similarly, U.S. Patent Publication Nos. 2014/0104077; 2014/0035774 also describe communications systems for communicating between automobiles and cooperation between automobiles. In addition, various communication standards have been developed and adopted for communication between automobiles, including, but not limited to IEEE 802.11p, IEEE 1609 and the European Telecommunications Standards Institute TC ITS (Intelligent Traffic Systems) standard. Any of these communications systems or standards, as well as any other suitable such standard or system may be used in the automobile 200 of the present disclosure. Thus, communication between automobiles allows automobiles to share information with each other, which may include location information, such as that provided by the GPS system noted above. Another automobile may provide information regarding tinting limits in a particular jurisdiction, if desired. Other information may be provided between automobiles as well, as will be discussed further below.

If desired, the remote control unit 12 need not be the smart phone of the user/driver, but may belong to a third party, such as a police officer, for example. Police officers often approach cars that are unknown to them and potentially dangerous. Any window tinting, even if relatively little, may conceal dangerous activity within an automobile that the officer should know about in order to safeguard his or her well-being. In an embodiment, police officers may be provided with the ability to control the tinting of any automobile, via their smart phone, for example. In this case, the officer's smart phone, or other mobile device, is used to provide instructions to the control device 10 in the user's automobile 200. In the interest of privacy, the smart phone 12a may be limited to sending instructions that will remove all tint in the windows 201, without the ability to affect any other operation of the automobile 200.

In an embodiment, instructions may be provided to the control device 10 directly from the police officer's automobile. As noted above, modern automobiles commonly include the ability to communicate directly between each other. In this case, the police automobile may communicate directly with the automobile 200 to de-tint the windows 201. In another embodiment, instructions may be provided from a central location, such as police headquarters, for example. As noted above, the automobile 200 may be configured for connectivity to the Internet or another communication network. Instructions to the control device 10 or otherwise to the automobile 200 may be provided via such a connection from a remote location, such as police headquarters, for example, such that window tint can be removed.

In an embodiment, the automobile 100 may include one or more light sensors 220, that may be used to detect the intensity of light projected from the head lights of other automobiles. This light intensity information may be used to provide instructions to the windows 201, to increase, or decrease tint, as desired, to prevent glare and to ensure that the driver maintains good vision while driving. This may be accomplished by a simple comparison of the detected light intensity from the light sensors 220 with a threshold level. If the detected level exceeds a threshold, instructions are provided to increase tint of the window 201 to prevent glare and/or temporary blindness of the driver. The light information from the sensors 220 may be provided to the control device 10, which may process it (compare it to a threshold) and provide control signals to the headlights 201, or may be provided to computer system 210, or other processing device, including but not limited to the remote control device 212 (smart phone) to provide instructions to the control device 10. As noted above, the control device 10 may be integrated into the computer system 210, if desired.

In an embodiment, the intensity of another automobile's headlights may be determined by information from that automobile. As noted above, it is common for automobiles to communicate information between themselves. Such information may include headlight intensity information, if desired. This information, in addition with location information from an oncoming automobile, for example, allows the automobile 200 to modify the tint of the windows 201 even before the headlights of the other automobile can be seen such that glare or blinding can be avoided. This information may be received and processed in the control device 10 or by the computer 210, or the remote control unit 12 (smart phone) as noted above. Location information regarding the automobile 200, obtained from the GPS system or otherwise may also be used to determine the relative distance between the automobile 200 and the oncoming automobile. In addition to tinting the windows, in an embodiment the headlights 202 of the automobile 200 may be darkened or shaded temporarily to prevent blinding the driver of the oncoming vehicle. The automobile 200 may also provide information to another vehicle. For example, the automobile 200 may provide headlight intensity information and location information as noted above to another vehicle.

In an embodiment, the SPD window 201 may be automatically cleared of any tint in the event of an accident. If the automobile 200 is in an accident, it may be important for first responders to be able to clearly see into the vehicle, and for the occupants to be able to see out and communicate with first responders. Accordingly, in an embodiment, the control device 10 will control the window 201 to remove all tint in the event of an accident. In an embodiment, the control device 10 may receive information that an airbag has deployed, signaling that an accident has occurred. Most modern vehicles include at least one airbag and the computer system 210 would typically receive information that an airbag had deployed. This information may be provided to the control device 10 or in the case where the control device 10 is integrated into the computer 210, simply processed to provide a control signal to the window 201 to remove the tint. In an embodiment, the window 201 may include an auxiliary power source that may be used to clear the tint of the window 201 in the event that the window is separated from the power system of the automobile in the accident. In another embodiment, an accident may be detected based on other information, for example, smart phones may include gyroscopic devices that track movement in different directions. An abrupt change of direction in multiple directions may be detected by the remote control unit 12 (smart phone) and used as an indication that an accident has occurred. In another embodiment, the location information, provided by the GPS system 203, for example, may indicate an abrupt stop or change in speed or direction that may also indicate that an accident has occurred.

The automobile 200 preferably also includes a transceiver 206 (transmitter and receiver) to transmit and receive information. As noted above, it is common for modern automobiles to allow for Internet access as well as communication with other automobiles. The GPS system 206 typically will include a transceiver for communication with GPS satellites. The transceiver 206 may be incorporated into the GPS system 203, or may be a separate element, as desired. The transceiver preferably provides for wireless communication and may include one or more antennas to transmit and receive information. The transceiver 206 may communicate with terrestrial communication networks such as cellular telephone networks and/or Wi-Fi networks or may communicate via satellite, if desired. The transceiver 206 may be used to receive and transmit information and may also be used to receive and transmit radar signals which may be used to supplement or provide location information and/or information regarding the position of other automobiles. The radar information may also provide an indication of an accident as well.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A control system for controlling one or more devices including a suspended particle device ("SPD") window, the control system comprising:
    a control device in communication with the one or more devices;
    a remote control unit configured to transmit device control instructions based on user input from a user and current environmental information obtained by the remote control unit; and
    the control device configured to control the operation of the one or more devices including the SPD window according to the device control instructions received from the remote control unit,
    wherein the current environmental information includes sound level information indicating a present sound level in the vicinity of the remote control unit,
    wherein the remote control unit transmits instructions to the one or more devices to operate the SPD window when the sound level is above a desired sound level.

2. The control system of claim 1, wherein the remote control unit further comprises a sensor providing current environmental information regarding conditions in the vicinity of the remote control unit.

3. The control system of claim 2, wherein the remote control unit further comprises:
    an input interface configured to receive information from the user.

4. The control system of claim 3, wherein the information provided by the user is threshold information indicating a desired value for at least one said environmental condition.

5. The control system of claim 4, wherein the remote control unit compares the desired value entered by the user to the current environmental information and transmits instructions for the one or more devices based on the comparison.

6. The control system of claim 5, wherein the instructions transmitted by the remote control unit include instructions to operate the one or more devices to meet the desired value when the current environmental information does not match the desired value.

7. The control system of claim 5, wherein the instructions provided by the remote control unit are based on additional information provided to the remote control unit.

8. The control system of claim 7, wherein the current environmental information includes temperature information regarding a current temperature in the vicinity of the remote control unit.

9. The control system of claim 8, wherein the additional information includes time of day information.

10. The control system of claim 9, wherein the instructions provided by the remote control unit vary based on the time of day information.

11. The control system of claim 7, wherein the current environmental information includes light level information regarding a current light level in the vicinity of the remote control unit.

12. The control system of claim 11, wherein the additional information includes time of day information.

13. The control system of claim 10, wherein the instructions provided by the remote control unit vary based on the time of day information.

14. The control system of claim 12, wherein the additional information also includes time of year information.

15. The control system of claim 14, wherein the instructions provided by the remote control unit vary based on the time of year information.

16. The control system of claim 4, wherein the current environmental information includes location information indicating a present location of the remote control unit.

17. The control system of claim 16, wherein the remote control unit transmits instructions to the one or more devices to operate the devices to match the desired value provided by the user.

18. The control system of claim 17, wherein the instructions vary based on the location information.

19. The control system of claim 1, wherein the current environmental information includes an indication of a user's heartbeat or pulse.

20. The control system of claim 19 wherein the remote control unit provides an indication to a user when the user's heartbeat or pulse drop's below a preset level.

21. The control system of claim 20, wherein the remote control unit transmits instructions to the one or more devices to contact medical help when the user requests help in response to the indication.

22. The control unit of claim 20, wherein the remote control unit transmits instructions to the one or more devices to contact medical help when the user provides no response to the indication after a predetermined period of time.

23. A control system for controlling one or more devices including a suspended particle device ("SPD") window in an automobile, the control system comprising:
    a control device in communication with the one or more of the devices;
    a data processor device configured to provide information to the control device; and
    the control device configured to control operation of the one or more of the devices including the SPD window by providing instructions to the one or more devices including the SPD window based on the information received from the data processor device,
    wherein the data processor device is a second central computer of another automobile.

24. The control system of claim 23, wherein the data processor device is a remote control unit.

25. The control system of claim 23, wherein the data processor device is a central computer of the automobile in communication with an external communication network.

26. The control system of claim 23, wherein the SPD window is adjustable to increase or decrease a tint of glass therein based on the instructions from the control device.

27. The control system of claim 26, further comprising a GPS data receiver system configured to provide location information indicative of a location of the automobile, wherein the instructions from the control device are based on the location of the automobile.

28. The control system of claim 26, further comprising at least one light sensor positioned on the automobile and connected to the control device to provide a detected light level of light shining on the automobile,
   wherein the instructions to the SPD window are based on the detected light level.

29. The control system of claim 26, wherein the data processor device is a mobile device of a third party and the information provided to the control device reduces a tint of the SPD window.

30. The control system of claim 26, wherein the data processor device is a remote stationary computer of a third party and the information provided to the control device reduces a tint of the SPD window.

31. The control system of claim 23, wherein the SPD window is adjustable to increase or decrease a tint of glass of the SPD window based on the instructions from the control device.

32. The control system of claim 31, further comprising a transceiver configured to transmit and receive information with the another automobile, and the information from the another automobile is location information related to the location of the another automobile relative to the automobile and the instructions from the control device depend on the location information.

33. The control system of claim 32, wherein the information from the another automobile is headlight intensity information related to headlight intensity of the another automobile and the instructions from the control device depend on the headlight intensity information.

34. The control system of claim 32, further comprising at least one SPD headlight element connected to the control device and adjustable to increase and decrease light intensity of at least one headlight.

35. The control system of claim 34, wherein the control device sends instructions to an SPD headlight assembly based on the location information.

36. The control system of claim 26, wherein the information provided by the data processor device is accident indication information and the instructions to the SPD window are based on the accident indication information.

37. The control system of claim 36, further comprising an auxiliary power source positioned adjacent to the SPD window to provide power thereto.

* * * * *